(12) United States Patent
Rossin et al.

(10) Patent No.: US 10,625,239 B2
(45) Date of Patent: Apr. 21, 2020

(54) POROUS MIXED METAL OXY-HYDROXIDES AND METHOD OF PREPARATION

(71) Applicants: Joseph A. Rossin, Plain City, OH (US); Gregory W. Peterson, Belcamp, MD (US); William F. Buechter, Fairfax, VA (US)

(72) Inventors: Joseph A. Rossin, Plain City, OH (US); Gregory W. Peterson, Belcamp, MD (US); William F. Buechter, Fairfax, VA (US)

(73) Assignees: THE UNITED STATES OF AMERICA AS REPRESENTED BY THE SECRETARY OF THE ARMY, Aberdeen Proving Ground, MD (US); GUILD ASSOCIATES INC., Plain City, OH (US)

( * ) Notice: Subject to any disclaimer, the term of this patent is extended or adjusted under 35 U.S.C. 154(b) by 390 days.

(21) Appl. No.: 15/072,325

(22) Filed: Mar. 16, 2016

(65) Prior Publication Data

US 2017/0266638 A1 Sep. 21, 2017

(51) Int. Cl.
*B01J 20/10* (2006.01)
*B01J 20/06* (2006.01)
*B01J 20/08* (2006.01)
*B01J 20/28* (2006.01)
*B01D 53/02* (2006.01)

(52) U.S. Cl.
CPC .............. *B01J 20/10* (2013.01); *B01D 53/02* (2013.01); *B01J 20/06* (2013.01); *B01J 20/08* (2013.01); *B01J 20/28059* (2013.01); *B01D 2253/106* (2013.01); *B01D 2253/1122* (2013.01); *B01D 2253/1124* (2013.01); *B01D 2253/25* (2013.01); *B01D 2257/302* (2013.01); *B01D 2257/408* (2013.01)

(58) Field of Classification Search
CPC ..................................................... G01N 31/224
See application file for complete search history.

(56) References Cited

PUBLICATIONS

Takahashi et al. "Study of Synthetic Clay Minerals. V. Lamellar Fraipontite-Silica Composite as a New Adsorbent", Bull. Chem. Soc. Jpn., 70, 609-614, 1997 (Year: 1997).*

* cited by examiner

*Primary Examiner* — Peter F Godenschwager
(74) *Attorney, Agent, or Firm* — Slayden Grubert Beard PLLC

(57) ABSTRACT

Provided are mixed metal oxy-hydroxides that serve as reactive media to bind, sequester, or alter one or more toxic chemicals such as sulfur dioxide ($SO_2$), hydrogen cyanide (HCN), and others. A reactive media includes: a porous metal oxy-hydroxide including at least one first transition metal that is optionally one or more of copper, zinc, or iron; a second transition metal linked to the first transition metal by a bond that includes an oxygen, the second transition metal selected optionally being one or more of magnesium, calcium, cobalt, titanium, zirconium, aluminum, and silicon; and the metal oxy-hydroxide terminated by at least one hydroxyl group. The resulting media provides for excellent porosity and reactivity for removal of toxic chemicals from the environment or a sample.

10 Claims, 7 Drawing Sheets

POROUS MIXED METAL OXY-HYDROXIDES AND METHOD OF PREPARATION

U.S. GOVERNMENT INTEREST

The invention described herein may be manufactured, used and licensed by or for the U.S. Government.

FIELD

This invention relates to a novel material comprised of mixtures of metal oxides and hydroxides (referred to as oxy-hydroxides) such as to form porous structures comprised of terminal hydroxyl groups and bridging oxygen. Said material has been found to be useful as a reactive adsorbent for the removal of acid gases, such as sulfur dioxide, from streams of air.

BACKGROUND

Reactive adsorbents, examples of which are primarily focused on activated, impregnated carbon, remove toxic chemicals from the gas streams via reactions between the reactive impregnants and the target chemical. Activated carbon possesses a high porosity but is relative inert and therefore not able to appreciably facilitate reactions necessary to remove toxic chemicals, such as for example sulfur dioxide ($SO_2$) and hydrogen cyanide (HCN). As a result, the activated carbon is impregnated with metal species, such as for example oxides, carbonates and hydroxides of metals that include copper and zinc, in order to facilitate the reactions. Although effective, activated, impregnated carbon is not without its drawbacks. As many reactions of interest are stoichiometric, the capacity of the activated, impregnated carbon is limited to the impregnant loading, which is often on the order of 6-10% by weight. In addition, the carbon substrate is flammable, presenting potential risks in applications employing large volumes of media, or when employed in reducing environments.

Zirconium hydroxide is a commercially available product that includes bridging oxygen and terminal hydroxyl groups. Although referred to as zirconium hydroxide, the material is in reality an oxy-hydroxide, as both ≡Zr—O—Zr≡ (bridging oxygen) and ≡Zr—OH (terminal hydroxyl) groups are present. Zirconium oxy-hydroxide is employed in a number of applications that include for example catalysis and ceramics. In these applications, the resulting catalyst or ceramic is fired at an elevated temperature, such as for example greater than 400° C., to yield the corresponding oxide.

Zirconium oxy-hydroxide in its as-received form was recently discovered to be effective in the removal of acid gases, such as for example sulfur dioxide (Peterson et al., *Ind. Eng. Chem. Res.* 48 (2009) 1694) and chlorine gases (Peterson and Rossin, *Ind. Eng. Chem. Res.* 51 (2012) 2675). As demonstrated by Peterson and Rossin (2012), only the terminal hydroxyl groups are reactive; i.e. able to contribute to the removal of chlorine gases.

SUMMARY

It is understood that both the following summary and the detailed description are exemplary and explanatory and are intended to provide further explanation of the disclosure as claimed. Neither the summary nor the description that follows is intended to define or limit the scope of the disclosure to the particular features mentioned in the summary or description.

Provided herein are a novel class of reactive solids including inter-dispersed mixtures of metal oxides and hydroxides, referred to as mixed metal oxy-hydroxides used as a reactive media. The novel mixed metal oxy-hydroxides include at least one metal selected from copper, zinc or iron and at least one metal selected from magnesium, calcium, cobalt, titanium, zirconium, manganese, silicon and aluminum. The novel mixed metal oxy-hydroxide may also include mixtures of copper and zinc, copper and iron, zinc and iron or copper, iron and zinc. Key properties of the mixed metal oxy-hydroxides may include a high concentration of terminal hydroxyl groups, excellent porosity, and minimal solubility in water.

In some aspects, the reactive media is characterized by a surface area of 50 $m^2/g$ or greater, optionally 200 $m^2/g$ or greater. In some aspects of any mixed metal oxy-hydroxide the fraction of oxygen associated with the material as terminal hydroxyl groups is 20 atomic percent or greater of the total oxygen, optionally 70 atomic percent or greater of the total oxygen.

A mixed metal oxy-hydroxide optionally has low water solubility, optionally of 0.1 gram per liter or less.

The reactive media includes a mixed metal oxy-hydroxide that optionally includes the following formula:

$$X_1\text{-}M_1\text{-}O\text{-}M_2\text{-}X_2 \qquad (II)$$

where $M_1$ and $M_2$ are each independently copper, iron, zinc, magnesium, calcium, cobalt, titanium, zirconium, aluminum, or silicon, $M_1$ is a different metal than $M_2$, $X_1$ and $X_2$ are each independently —$(OH)_n$ or —$(O\text{-}M_3)_y\text{-}(OH)_n$ where: $M_3$ is copper, iron, zinc, magnesium, calcium, cobalt, titanium, zirconium, aluminum, or silicon; n is a value dependent on the valency of the terminal metal to which the hydroxyl group is attached, optionally, n is 1, 2, 3, 4, 5, or 6; and y is a value from 0 to 100 or more. Optionally $M_1$ or $M_2$ is magnesium, calcium, cobalt, titanium, zirconium, aluminum, or silicon. In other aspects, the mixed metal oxy-hydroxide includes the formula of:

$$(HO)_n\text{-}M_1\text{-}O\text{-}M_2\text{-}O\text{-}M_3\text{-}(OH)_n \qquad (III)$$

where $M_1$, $M_2$ and $M_3$ are each independently copper, iron, zinc, magnesium, calcium, cobalt, titanium, zirconium, aluminum, or silicon; and where at least one of $M_1$, $M_2$ and $M_3$ is copper, iron, or zinc.

In any of the mixed metal oxy-hydroxides, the first transition metal is optionally present at 10% to 99% the atomic percentage of metal in the composition; and further including a second transition metal linked to the first transition metal by a bond including an oxygen; the second transition metal present at 1% to 90% atomic percent metal. In any aspect, the first transition metal is optionally present at 50 to 90 atomic percent metal in the composition. Optionally, the second transition metal present at 10 to 50 atomic percent metal. In some aspects, the second transition metal is silicon, optionally in a composition where the first transition metal is present at 50 to 90 atomic percent metal in said composition.

Mixed metal oxy-hydroxides may be prepared by precipitation techniques. Precipitation involves contacting an acidic mixed metal aqueous solution, such as for example chlorides of iron and zinc, with an alkaline solution, such as for example sodium hydroxide, at a near constant pH or over a pH range, as necessary to bring about the formation of the oxy-hydroxide, which precipitates from solution as a solid that is readily removed by filtration. In some aspects, it is necessary to control the pH of the precipitation in order to bring about the appropriate co-precipitation, control the porosity and optimize the presence of terminal hydroxyl groups.

Typically, reactive materials are comprised of an inert porous substrate onto which reactive moieties are impregnated. In the case of the novel material described herein, the substrate is largely comprised of reactive moieties, namely terminal hydroxyl groups, which provide exceptional reactive properties.

DETAILED DESCRIPTION

Figure 1:
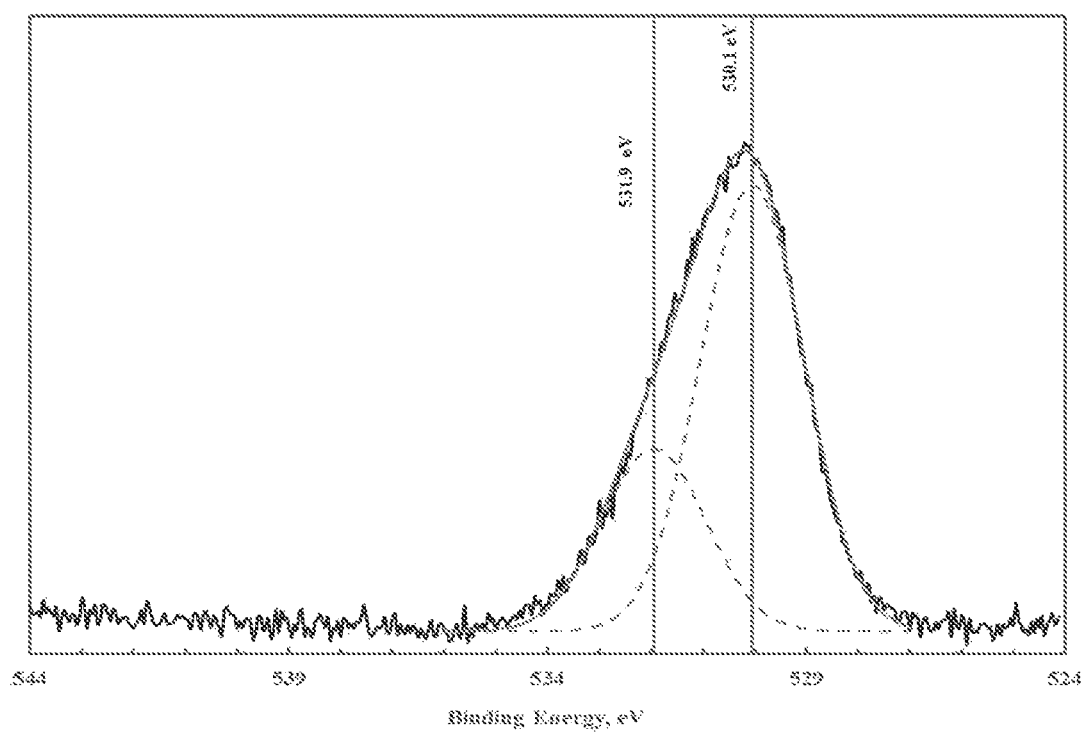
FIG. 1 illustrates XPS spectra of the oxygen 1s photoelectron region corresponding to zinc oxy-hydroxide.

The following description of particular aspect(s) is merely exemplary in nature and is in no way intended to limit the scope of the invention, its application, or uses, which may, of course, vary. The disclosure is described with relation to the non-limiting definitions and terminology included herein. These definitions and terminology are not designed to function as a limitation on the scope or practice of the disclosure but are presented for illustrative and descriptive purposes only.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Novel reactive materials including mixed metal oxides and hydroxides, referred to as mixed metal oxy-hydroxides are provided that have utility as reactive materials for the removal of toxic chemicals such as for example sulfur dioxide ($SO_2$) and hydrogen cyanide (HCN). Mixed metal oxy-hydroxides as provided herein include at least one metal selected from a group that includes copper, iron and zinc plus at least one metal selected from a group that includes magnesium, calcium, cobalt, titanium, zirconium, aluminum and silicon. Alternatively, the mixed metal oxy-hydroxide includes two or more metals selected from copper, iron and zinc. In its simplest form, the mixed metal oxy-hydroxide can be represented as:

$$(HO)_n\text{-}M_1\text{-}O\text{-}M_2\text{-}(OH)_n \qquad (I)$$

where $M_1$ and $M_2$ are each independently copper, iron, zinc, magnesium, calcium, cobalt, titanium, zirconium, aluminum, or silicon, and $M_1$ is a different metal than $M_2$. n is appreciated as a value dependent on the valency of the terminal metal to which the hydroxyl group is attached. Optionally, n is 1, 2, or 3.

More complex mixed metal oxy-hydroxides are fully envisioned such as mixed metal oxy-hydroxides including the formula of:

$$X_1\text{-}M_1\text{-}O\text{-}M_2\text{-}X_2 \qquad (II)$$

where $M_1$ and $M_2$ are each independently copper, iron, zinc, magnesium, calcium, cobalt, titanium, zirconium, aluminum, or silicon, and $M_1$ is a different metal than $M_2$. $X_1$ and $X_2$ are each independently $-(OH)_n$ or $-(O\text{-}M_3)_y\text{-}(OH)_n$ where: $M_3$ is copper, iron, zinc, magnesium, calcium, cobalt, titanium, zirconium, aluminum, or silicon; n is a value dependent on the valency of the terminal metal to which the hydroxyl group is attached, optionally, n is 1, 2, or 3; and y is a value from 0 to 100 or more. $M_3$ is optionally the same metal as $M_1$ or $M_2$. $M_3$ is optionally not the same metal as $M_1$ or $M_2$. In all instances, $M_3$ is optionally not the same metal for each instance of $M_3$ depending on the value of y.

In some aspects, a mixed metal oxy-hydroxide includes the following formula:

$$(HO)_n\text{-}M_1\text{-}O\text{-}M_2\text{-}O\text{-}M_3\text{-}(OH)_n \qquad (III)$$

where $M_1$, $M_2$ and $M_3$ are each independently copper, iron, zinc, magnesium, calcium, cobalt, titanium, zirconium, aluminum, or silicon.

Figure 2:
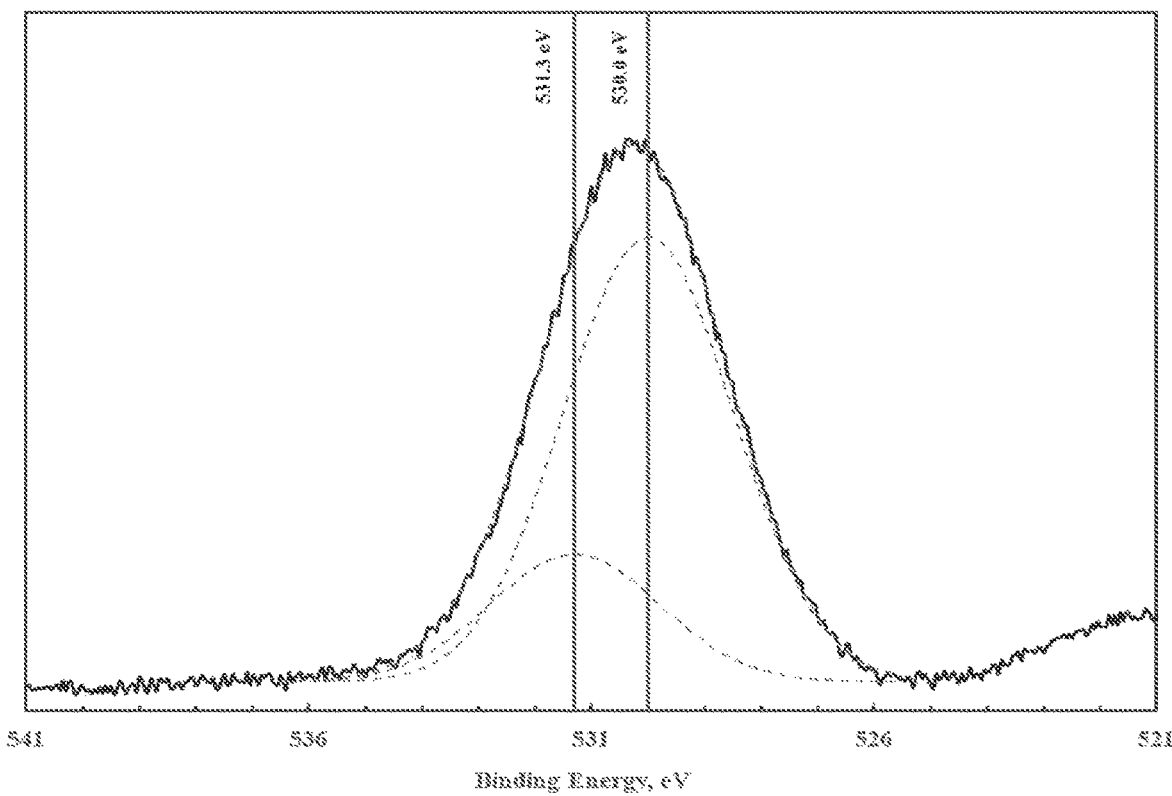
FIG. 2 illustrates XPS spectra of the oxygen 1s photoelectron region corresponding to iron oxy-hydroxide.
Figure 3:
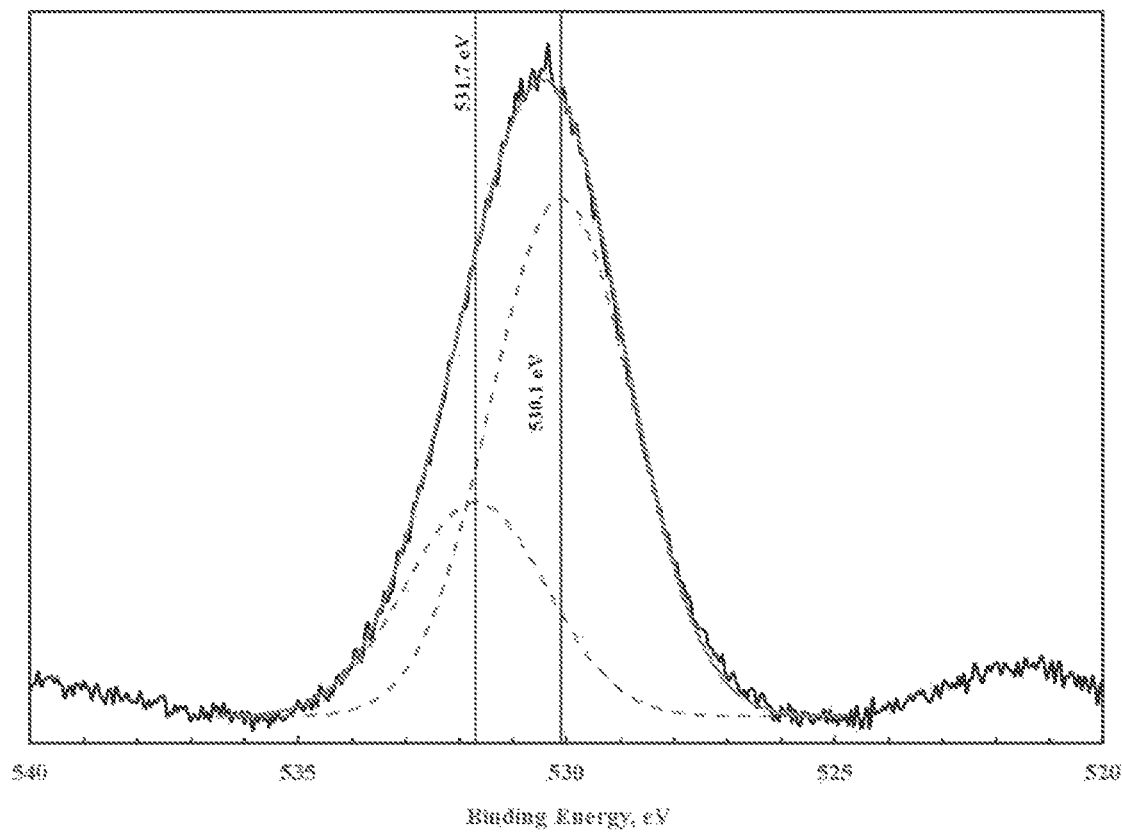
FIG. 3 illustrates XPS spectra of the oxygen 1s photoelectron region corresponding to copper oxy-hydroxide.

The novel materials display two types of oxygen, namely bridging oxygen (e.g. $\text{-}M_1\text{-}O\text{-}M_2\text{-}$) and terminal hydroxyl groups (e.g. $\text{-}M_1\text{-}OH$). The bridging oxygens are believed to play a significant role in promoting porosity, while the terminal hydroxyl groups are believed to play a significant role in promoting reactivity. The presence and relative quantities of bridging and terminal hydroxyl groups can be ascertained using X-ray photoelectron spectroscopy (XPS). XPS provides information related to the elemental speciation, which for the case at hand can be determined by mathematical analysis of the oxygen 1s photoelectron peak. Mathematical analysis of the oxygen 1s photoelectron peak, namely peak deconvolution, can yield information related to the chemical state of oxygen. FIGS. 1 through 3 illustrate the XPS spectra of the oxygen 1s photoelectron region corresponding to zinc, iron and copper oxy-hydroxides. As shown in FIGS. 1 through 3, deconvolution of the oxygen 1s photoelectron peak yields two distinct oxygen peaks. The lower binding energy peak (at about 530.0 eV) is due to the presence of bridging oxygen. The higher binding energy peak (at about 531.3-531.9 eV) is due to the presence of terminal hydroxyl groups (van der Brand et al., Surf. Int. Anal 36 (2004) p. 81-88). As shown, the fraction of terminal hydroxyl groups is small (less than 30%).

Figure 4:
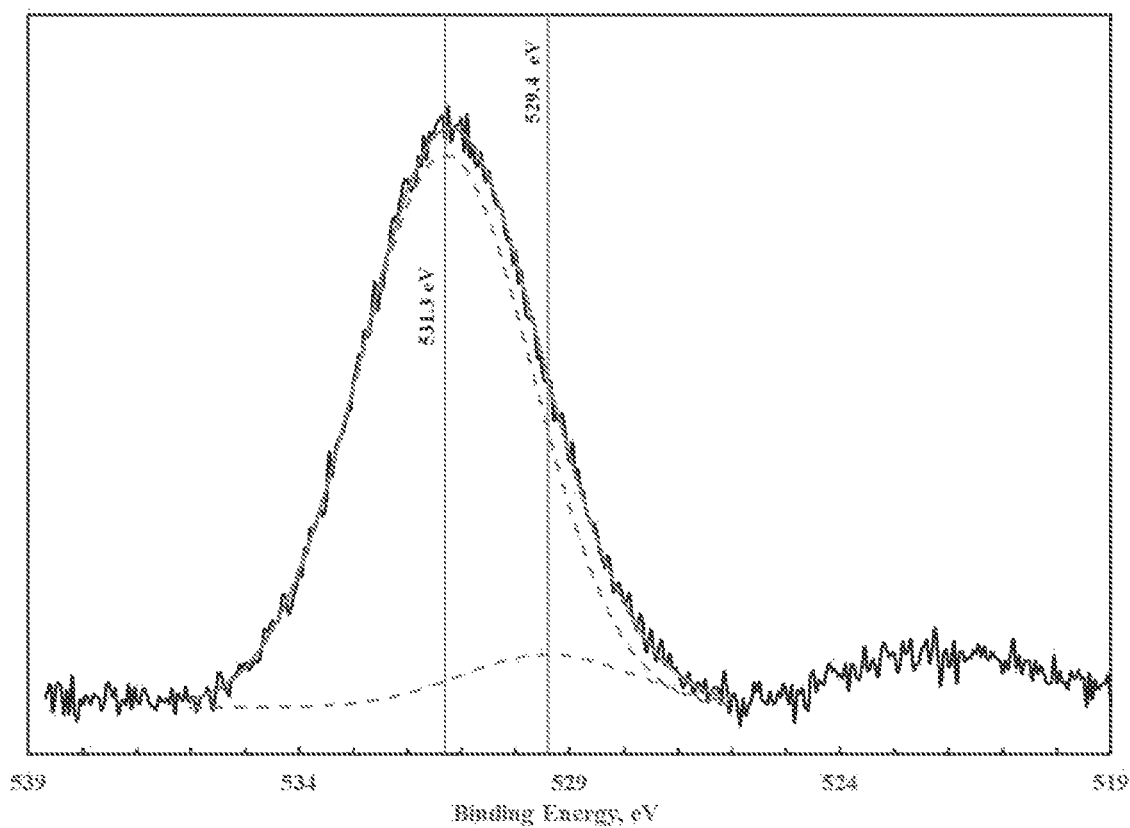
FIG. 4 illustrates XPS spectra of the oxygen 1s photoelectron region corresponding to zinc-silicon oxy-hydroxide.
Figure 5:
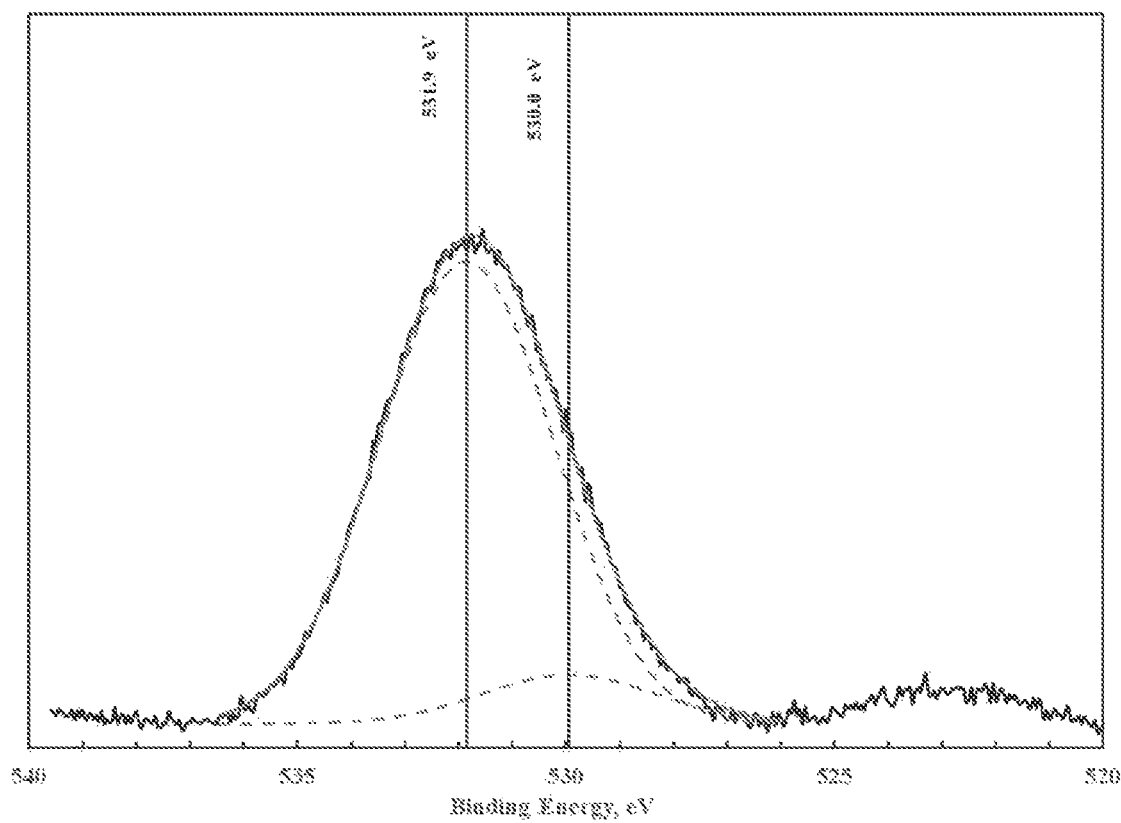
FIG. 5 illustrates XPS spectra of the oxygen 1s photoelectron region corresponding to zinc-aluminum oxy-hydroxide.
Figure 6:
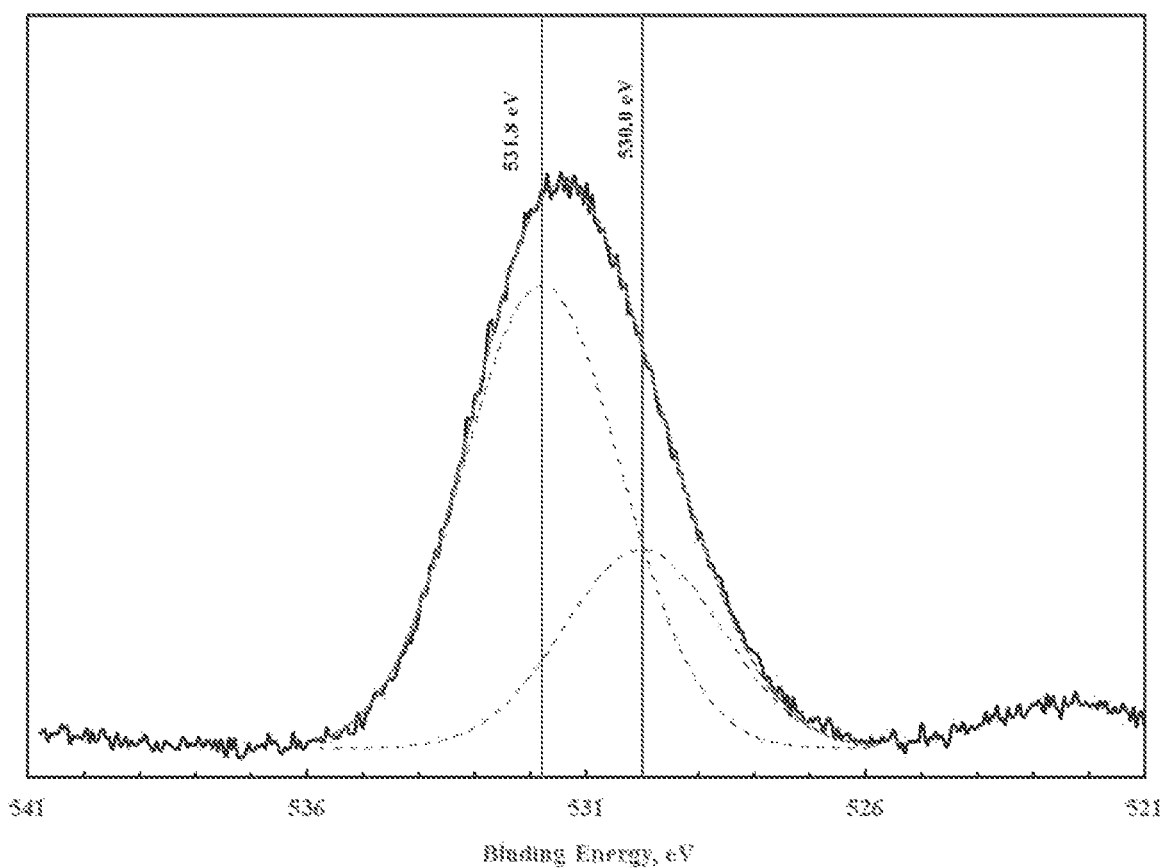
FIG. 6 illustrates XPS spectra of the oxygen 1s photoelectron region corresponding to iron-silicon oxy-hydroxide.
Figure 7:
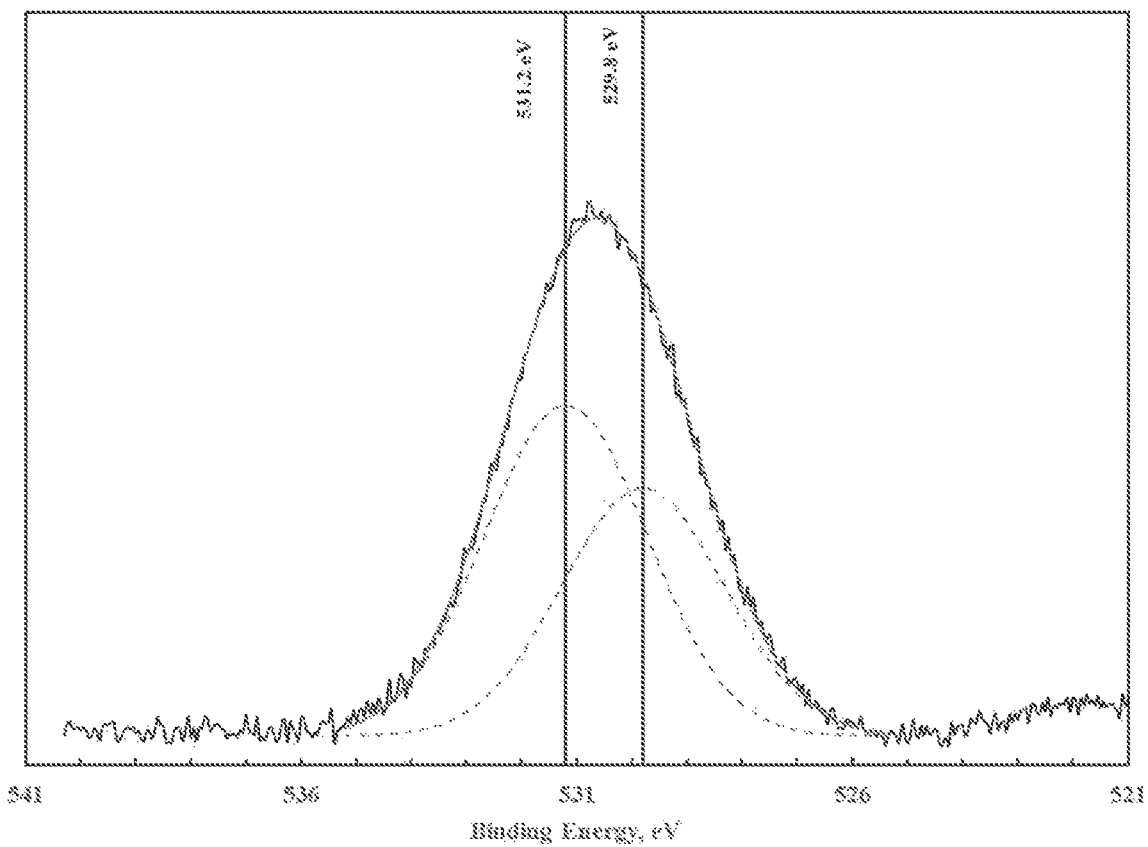
FIG. 7 illustrates XPS spectra of the oxygen 1s photoelectron region corresponding to copper-iron-silicon oxy-hydroxide.

FIGS. 4 through 6 illustrate the XPS spectra of the oxygen 1s photoelectron region corresponding to zinc-silicon, zinc-aluminum and iron-silicon oxy-hydroxide, respectively. Note that for these materials, the fraction of terminal hydroxyl groups is significantly greater than those corresponding to the pure zinc and iron oxy-hydroxides. As will be shown in examples herein, the mixed metal oxy-hydroxides display both greater surface area and greater chemical reactivity relative to the pure zinc, iron or copper oxy-hydroxides.

The metals copper, iron and zinc are selected as their hydroxides are reactive in the removal of a broad range of acid gases that include $SO_2$ and HCN. As used herein, the term "acidic gas" means a gas at 1 atmosphere and 25° C. that will form an acidic solution when dissolved in water. The metals magnesium, calcium and aluminum are believed to promote terminal hydroxyl groups. The metals titanium, zirconium and silicon are believed to promote porosity.

Mixed metal oxy-hydroxides are reactive, porous solids with a very low solubility in water. While not wishing to be bound by any particular theory, the reactivity is believed to be derived from the terminal hydroxyl groups. To be especially useful, the surface area of the mixed-metal oxy-hydroxides should be greater than 50 m$^2$/g, optionally greater than 200 m$^2$/g, optionally greater than 300 m$^2$/g. In some aspects, the fraction of oxygen associated with the material as terminal hydroxyl groups is greater than at least 20% of the total oxygen, optionally greater than 40% of the total oxygen, optionally greater than 70% of the total oxygen.

In some aspects, the solubility of the mixed metal oxy-hydroxide in water is less than 1 g per liter of water, optionally less than 0.1 g per liter of water, optionally less than 0.01 g per liter of water.

The composition of the mixed metal oxy-hydroxide can vary greatly, with the composition dependent on the application. The composition can range from about 10% by weight to about 100% by atomic percent metal of copper, iron or zinc, or mixtures thereof, with the balance selected from metals that include magnesium, calcium, cobalt, titanium, zirconium, aluminum or silicon. The composition optionally ranges from about 10% by weight to about 99% by atomic percent metal copper, iron or zinc, or mixtures thereof, with the balance or metal selected from metals that include magnesium, calcium, cobalt, titanium, zirconium, aluminum or silica. Optionally, the porous metal hydroxide includes of at least 50% atomic percent metal of copper, iron or zinc, or mixtures thereof, with the balance selected from magnesium, calcium, cobalt, titanium, zirconium, aluminum, silicon, or mixtures thereof. In some aspects, the mixed metal oxy-hydroxide includes about 30% atomic percent metal to about 95% atomic percent metal iron, copper or zinc, and about 5% atomic percent metal to about 70% atomic percent metal silicon, zirconium or aluminum.

Mixed metal oxy-hydroxides may be prepared by contacting a soluble salt solution (aqueous) of metal chlorides, sulfates, nitrates, fluorides, acetates, oxalates, etc. with an alkaline solution (aqueous) at a pH or pH range sufficient to bring about co-precipitation of the metals. The alkaline solution may include lithium hydroxide, sodium hydroxide, potassium hydroxide, cesium hydroxide, or mixtures thereof. Ammonium hydroxide may also be employed. Sodium hydroxide and potassium hydroxide are the preferred alkali. Precipitation of mixed metal oxy-hydroxides occurs via reactions as described below when conducted at a pH in which the metal hydroxide is insoluble in solution, leading to precipitation by the following exemplary reaction scheme:

$$M_1Cl_3(aq)+M_2Cl_2(aq)+5NaOH \rightarrow M_1(OH)_3+M_2(OH)_2+5NaCl \quad (IV)$$

The above reaction is followed by dehydration, also referred to as polycondensation, to yield the mixed metal oxy-hydroxide by the following exemplary reaction scheme:

$$M_1(OH)_3+M_2(OH)_2 \rightarrow (HO)_2\text{-}M_1\text{-}O\text{-}M_2\text{-}(OH)+H_2O \quad (V)$$

Mixed metal oxy-hydroxides can be prepared via precipitation. For example, mixed metal oxy-hydroxides may be prepared by contacting a soluble acidic metal solution, such as for example metal chloride, nitrate, sulfate, fluoride, oxalate or acetate, with a caustic solution, such as for example sodium hydroxide or potassium hydroxide, at a pH or over a pH range suitable to bring about precipitation and subsequent polycondensation reactions as described previously. Aluminum or silicon, or mixtures thereof, can be added as alkaline solutions of sodium aluminate and sodium silicate, respectively, or mixtures thereof. As it is desired for the mixed metal oxy-hydroxide to have a high concentration of terminal hydroxyl groups, the precipitation should be performed at a basic pH. In one method of preparation, an acidic metal solution, such as for example a mixture of iron chloride and zinc chloride, is added over a discrete period of time to an alkaline solution while the pH is maintained between 7.0 and 9.0, optionally between 10.0 and 11.0, and optionally between 12.0 and 14.

In an alternative preparation, the pH of the acidic metal solution may be increased from its initial value (acidic) to the target pH using an alkaline solution. For example, an iron-zinc oxy-hydroxide may be prepared from a solution prepared by dissolving iron chloride and zinc chloride in deionized (DI) water by adding an appropriate amount of alkali solution necessary to raise the pH to the target value necessary to bring about precipitation and subsequent polycondensation. However, in order to optimize the presence of terminal hydroxyl groups, the pH of the solution should be increased to 7 to 14 using an appropriate alkali, optionally 10 to 14, optionally 12 to 14.

Precipitation reactions such as those described herein are highly exothermic. As a result, it is necessary to combine the solutions slowly as a means of controlling the temperature. Additionally, cooling may be employed. For example, cooling coils may be inserted into the mixing vessel, and/or the solutions may be cooled to reduced temperatures prior to precipitation.

Upon completion of the precipitation, the solids are filtered from solution and washed with water in order to remove residual alkali. In order to more effectively remove the alkali, the solids can be washed with a dilute (less than 0.1 molar) acid solution, such as nitric or acetic acid.

Drying is a key step in the operation, as at too high of temperature, the porous metal oxy-hydroxide will begin to decompose to the corresponding oxide. Said excessive drying will decrease the porosity of the resulting solid plus remove terminal hydroxyl groups, which are necessary to facilitate chemical reactions. Ideally, the porous metal hydroxide is dried at temperatures below about 150° C. to the target moisture content, typically less than 10% water by weight. The upper temperature limit employed in the drying operation will depend upon the composition of the porous metal hydroxide.

Such processes optionally produce a mixed metal oxy-hydroxide that is substantially pure. The term substantially pure is meant free of additional contaminating metals, salts, acids, or other materials that may detract from the effectiveness of the resulting porous metal hydroxide. Substantially pure optionally means 90% pure, optionally 91% pure, optionally 92% pure, optionally 93% pure, optionally 94% pure, optionally 95% pure, optionally 96% pure, optionally 97% pure, optionally 98% pure, optionally 99% pure, optionally 99.1% pure, optionally 99.2% pure, optionally 99.3% pure, optionally 99.4% pure, optionally 99.5% pure, optionally 99.6% pure, optionally 99.7% pure, optionally 99.8% pure, optionally 99.9% pure, or of greater purity.

Co-precipitation of the mixed metal oxy-hydroxide was found to yield materials with greater porosity than that associated with the precipitation of the pure metals, and in many cases was found to yield a greater fraction of terminal hydroxyl groups and corresponding greater chemical reactivity. It is desired that the surface area of the porous metal oxy-hydroxide be greater than 50 $m^2/g$, optionally greater than 200 $m^2/g$, optionally greater than 300 $m^2/g$. In some aspects, a surface area is from 100 $m^2/g$ to 600 $m^2/g$, or any value or range therebetween, optionally 250 $m^2/g$ to 600 $m^2/g$, optionally 100 $m^2/g$ to 450 $m^2/g$, optionally 250 $m^2/g$ to 450 $m^2/g$.

Pore volume of a mixed metal oxy-hydroxide is optionally at or greater than 0.1 $cm^3/g$, optionally at or greater than 0.3 $cm^3/g$. In some aspects, pore volume is 0.1 $cm^3/g$ to 1.2 $cm^3/g$, or any value or range therebetween, optionally 0.3 $cm^3/g$ to 1.2 $cm^3/g$, optionally 0.1 $cm^3/g$ to 0.9 $cm^3/g$, optionally 0.3 $cm^3/g$ to 0.9 $cm^3/g$.

When forming the mixed metal oxy-hydroxide, structure directing agents may be added to the precipitation solution to enhance the porosity. Examples of structure directing agents include, but are not limited to glycols, ethers, quaternary ammonium salts, and the like. Examples of glycols include polyethylene glycol and polypropylene glycol. Examples of ethers include dimethyl ether and diethyl ether. Examples of quaternary ammonium salts include tetrapropylammonium bromide and tetrabutulammonium bromide. The use of structure directing agents can greatly affect the porosity of the resulting porous mixed metal oxy-hydroxide.

Mixed metal oxy-hydroxides are prepared as powders and as such, may require processing to put the material in a usable form, such as for example granules, beads and extrudates. Granules can be prepared by processing the dried powder as tablets using a tabletting machine, with the resulting tablets crushed and sieved to the desired mesh size. Alternatively, several of the preparations were discovered to yield extrudable doughs, which, when dried to a target moisture content, can be processed as extrudates. Exemplary compositions that result in extrudable doughs include 75% Zn-25% Si oxy-hydroxide, 57% Fe-27% Si-16% Mg oxy-hydroxide, and 60% Zn-30% Fe-10% Zr oxy-hydroxide. Alternatively, the applicants found that several of the preparations can be dried to a powder, then formed into beads using techniques known to one skilled in the art, such as for example and Eirich mixer.

For many applications, such as chemical filtration, the mixed metal oxy-hydroxide in an engineered form, such as for example beads, granules, cylinders, etc. Forming the mixed metal oxy-hydroxide powder into an engineered form can be accomplished using techniques known to one skilled in the art. One technique involves briquetting or tableting the mixed metal oxy-hydroxide powder using an appropriate device, such as for example a roll compactor or a tableting machine. The resulting briquettes or tablets are then ground using such as for example a hammer mill or jaw crusher to reduce the briquettes or tablets into granules. Product granules are then sieved to the appropriate mesh size, such as for example 6×12 mesh, 12×30 mesh, 20×40 mesh, 40×140 mesh, etc.

The reactive media has an acid gas removal capacity. Gas removal capacity is optionally between 10 mg and 100 mg gas per gram of reactive media, optionally greater than 50 mg/g.

Testing Methods

Sulfur dioxide ($SO_2$) breakthrough curves were recorded by loading 7.55 $cm^3$ of 20×40 mesh media particles into a 3.1 cm inside diameter jacketed test cell. The volume of media is sufficient to produce a bed depth of 1.0 cm. The media was exposed to flowing air at 15% relative humidity containing 4,000 $mg/m^3$ $SO_2$. The flow rate was 3.0 liters per minute, sufficient to yield a linear velocity of 6.6 cm/s. The test was performed at 25° C. The effluent concentration of $SO_2$ was monitored continuously using a UV visible detector. The test was used to determine the $SO_2$ breakthrough time, which is defined as the time in which the effluent concentration of $SO_2$ exceeds 13 $mg/m^3$.

Hydrogen cyanide (HCN) breakthrough curves were recorded by loading 13.2 $cm^3$ of 20×40 mesh media particles into a 4.1 cm inside diameter test cell. The volume of media is sufficient to produce a bed depth of 1.0 cm. The media was exposed to flowing air at 50% relative humidity containing 4,000 $mg/m^3$ HCN. The flow rate was 5.2 liters per minute, sufficient to yield a linear velocity of 6.6 cm/s. The test was performed at 25° C. The effluent concentration of HCN was monitored near continuously using a gas chromatograph equipped with a flame ionization detector. The test was used to determine the HCN breakthrough time, which is defined as the time in which the effluent concentration of HCN exceeds 5 $mg/m^3$.

The compositions of the materials are expressed as weight percent metal and is calculated by dividing the weight of the individual metal by the total weight of all metals.

EXAMPLES

Example 1: Preparation of Zinc Oxy-Hydroxide (Comparative)

150 g of zinc chloride was dissolved in 400 ml of DI water. 1 liter of DI water was added to a 1 gallon pail. A cooling coil extended into the water and was used to control the temperature at about 20° C. The water was mixed using a high shear mixer. Using a peristaltic pump, the zinc chloride solution was metered into the water while mixing. The resulting slurry was maintained at a pH of 12 by adding a 50% KOH solution as needed. Once complete, the resulting slurry was allowed to mix for 6 hours, then allowed to stand overnight. In the morning, the solution was filtered, then washed twice with 3 liters of DI water at about 90° C. Following washing, the resulting solids were dried at 90° C. overnight. The resulting solids were crushed and sieved to yield 20×40 mesh particles (density=0.85 $g/cm^3$). The surface area of the sample was 91 $m^2/g$. The sample was evaluated using X-ray photoelectron spectroscopy. Analysis of the oxygen is photoelectron region yielded 29% terminal hydroxyl groups. The resulting sample was evaluated for its ability to remove $SO_2$ using the test method described above in Testing Methods. The $SO_2$ breakthrough time was 3 minutes.

Example 2: Preparation of Iron Oxy-Hydroxide (Comparative)

267 g of iron (III) chloride hexahydrate was dissolved in 600 ml of DI water. 1 liter of DI water was added to a 1 gallon pail. The pH of the solution was adjusted to 12 by adding a few drops of 50% NaOH solution. A cooling coil extended into the water and was used to control the temperature at about 20° C. The water was mixed using a high shear mixer. Using a peristaltic pump, the iron (III) chloride solution was metered into the caustic solution while mixing. The slurry was maintained at a pH of 12 using a 50% NaOH solution. Once complete, the resulting slurry was allowed to mix for 6 hours, then allowed to stand overnight. In the morning, the solution was filtered, then washed twice with 3 liters of DI water at about 90° C. Following washing, the resulting solids were dried at 90° C. overnight. The resulting solids were crushed and sieved to yield 20×40 mesh particles. The surface area of the sample was 182 $m^2/g$. The sample was evaluated using X-ray photoelectron spectroscopy. Analysis of the oxygen 1s photoelectron region yielded 23% terminal hydroxyl groups. The resulting sample was evaluated for its ability to remove $SO_2$ using the test method described above in Testing Methods. The $SO_2$ breakthrough time was 8 minutes.

Example 3: Preparation of Copper Oxy-Hydroxide (Comparative)

200 g of copper (II) chloride dihydrate was dissolved in 600 ml of DI water. 1 liter of DI water was added to a 1 gallon pail. The pH of the water was increased to 12 by adding a few drops of a 50% NaOH solution. A cooling coil extended into the water and was used to control the temperature at about 20° C. The water was mixed using a high shear mixer. Using a peristaltic pump, the copper (II) chloride solution was metered into the caustic solution while mixing. The slurry was maintained at a pH of 12 using a 50% NaOH solution. Once complete, the resulting slurry was allowed to mix for 4 hours, then allowed to stand overnight. In the morning, the solution was filtered, then washed twice with 3 liters of DI water at about 75° C. Following washing, the resulting solids were dried at 90° C. overnight. The resulting solids were crushed and sieved to yield 20×40 mesh particles (density=1.26 $g/cm^3$). The surface area of the sample was 13.5 $m^2/g$. The sample was evaluated using X-ray photoelectron spectroscopy. Analysis of the oxygen 1s photoelectron region yielded 19% terminal hydroxyl groups. The resulting sample was evaluated for its ability to remove $SO_2$ using the test method described above in Testing Methods. The $SO_2$ breakthrough time was 2 minutes.

Example 4: Preparation of 75% Zn-25% Si Oxy-Hydroxide 400 ml of DI water was added to a 1 liter TFE jar. To the jar was added 50 ml of a concentrated HCl solution. 191.3 g of a sodium silicate solution (28 wt % as $SiO_2$ or 13.07 wt % Si) was brought to 250 ml total volume with DI water. The sodium silicate solution was then added to the HCl solution while stirring. To the resulting silica solution was added 250 g of a zinc chloride solution (62.5 wt % $ZnCl_2$ or 30.0 wt % Zn). 2 liter of DI water was added to a 1 gallon pail along with 25 g of a 50 wt % NaOH solution. A cooling coil extended into the water and was used to control the temperature at about 20° C. The water was mixed using a high shear mixer. Using a peristaltic pump, the metals solution (zinc-silica) as added to the water over a 30 minute period with the pH maintained at 12.5 using a 50 wt % KOH solution. Upon completion of the precipitation, the resulting slurry was mixed for 6 hours, then allowed to stand overnight. In the morning, the slurry was filtered, with the resulting solids washed twice with hot DI water to remove the excess sodium. The resulting solids were dried overnight at 90° C., then crushed and sieved to 20×40 mesh granules (density=0.80 $g/cm^3$). The surface area of the resulting solids was 112 $m^2/g$. The sample was evaluated using X-ray photoelectron spectroscopy. Analysis of the oxygen 1s photoelectron region yielded 91% terminal hydroxyl groups. The resulting sample was evaluated for its ability to remove $SO_2$ using the test method described previously. The $SO_2$ breakthrough time was 20 minutes. The resulting sample was evaluated for its ability to remove HCN using the test method described above in Testing Methods. The HCN breakthrough time was 27 minutes.

Example 5: Preparation of 40% Zn-60% Si Oxy-Hydroxide 400 ml of DI water was added to a 1 liter TFE jar. To the jar was added 50 ml of a concentrated HCl solution. 200 g of a sodium silicate solution (28 wt % as $SiO_2$ or 13.07 wt % Si) was brought to 250 ml total volume with DI water. The sodium silicate solution was then added to the HCl solution while stirring. To the resulting silica solution was added 58.2 g of a zinc chloride solution (62.5 wt % $ZnCl_2$ or 30.0 wt % Zn). 1 liter of DI water was added to a 1 gallon pail along with 25 g of a 50 wt % NaOH solution. A cooling coil extended into the water and was used to control the temperature at about 20° C. The water was mixed using a high shear mixer. Using a peristaltic pump, the metals solution (zinc-silica) as added to the water over a 30 minute period with the pH maintained at 12.0 using a 50 wt % KOH solution. Upon completion of the precipitation, the resulting slurry was mixed for 6 hours, then allowed to stand overnight. In the morning, the slurry was filtered, with the resulting solids washed twice with hot DI water to remove the excess sodium. The resulting solids were dried overnight at 90° C., then crushed and sieved to 20×40 mesh granules (density=0.56 $g/cm^3$). The surface area of the resulting solids was 156 $m^2/g$. The sample was evaluated using X-ray photoelectron spectroscopy. Analysis of the oxygen 1s photoelectron region yielded 84% terminal hydroxyl groups. The resulting sample was evaluated for its ability to remove $SO_2$ using the test method described above in Testing Methods. The $SO_2$ breakthrough time was 12 minutes.

Example 6: Preparation of 75% Zn-25% Al Oxy-Hydroxide 300 g of a sodium aluminate solution (20 wt % as $Al_2O_3$ or 10.6 wt % Al) was added to 1 liter DI water. A cooling coil extended into the solution and was used to control the temperature at about 20° C. The solution was mixed using a high shear mixer. To the resulting sodium aluminate solution was added a zinc chloride solution prepared by diluting 317.6 g of a 62.5 wt % zinc chloride solution (30.0 wt % Zn) to 700 ml DI water using a peristaltic pump. The precipitation was performed over a 30 minute period with the pH maintained at 12.0 using a 50 wt % NaOH solution. Upon completion of the precipitation, the resulting slurry was mixed for 6 hours, then allowed to stand overnight. In the morning, the slurry was filtered, with the resulting solids washed twice with hot DI water to remove the excess sodium. The resulting solids were dried overnight at 90° C., then crushed and sieved to 20×40 mesh granules (density=0.92 $g/cm^3$). The surface area of the resulting solids was 162 $m^2/g$. The sample was evaluated using X-ray photoelectron spectroscopy. Analysis of the oxygen is photoelectron region yielded 90% terminal hydroxyl groups. The resulting sample was evaluated for its ability to remove $SO_2$ using the test method described above in Testing Methods. The $SO_2$ breakthrough time was 22 minutes. The resulting sample was evaluated for its ability to remove HCN using the test method described above in Testing Methods. The HCN breakthrough time was 27 minutes.

Example 7: Preparation of a 75% Zn-25% Zr Oxy-Hydroxide 1 liter DI water was added to a 4 liter plastic pail. A cooling coil extended into the solution and was used to control the temperature at about 20° C. The pH of the solution was adjusted to 13 by adding a trace of a 50% potassium hydroxide solution. The solution was mixed using a high shear mixer. A zinc-zirconium chloride solution was prepared by adding 200 g of a 62.5% zinc chloride solution (30.0 wt % Zn) and 135 g of a zirconium oxychloride solution (14.8 wt % Zr) to a glass beaker. The volume of the solution was increased to 700 ml using DI water. The resulting solution was delivered to the water in the 4 liter plastic pail using a peristaltic pump. The precipitation was performed over a 30 minute period with the pH maintained at 13.0 using a 50 wt % potassium hydroxide solution. Upon completion of the precipitation, the resulting slurry was mixed for 5 hours, then allowed to stand overnight. In the morning, the slurry was filtered, with the resulting solids washed twice with hot DI water to remove the excess potassium. The resulting solids were dried overnight at 90° C., then crushed and sieved to 20×40 mesh granules (density=1.04 g/cm$^3$). The surface area of the resulting solids was 256 m$^2$/g. The sample was evaluated using X-ray photoelectron spectroscopy. Analysis of the oxygen 1s photoelectron region yielded 68% terminal hydroxyl groups. The resulting sample was evaluated for its ability to remove $SO_2$ using the test method described above in Testing Methods. The $SO_2$ breakthrough time was 26 minutes.

Example 8: Preparation of a 74% Fe-26% Si Oxy-Hydroxide 80 g NaOH pellets and 100 g $Na_2SiO_3$ solution were added to a 1 gallon pail along with 1 liter DI water. A cooling coil was placed in the pail to maintain the temperature at about 20° C. during the precipitation operation. The contents of the pail were mixed using a high shear mixer. 300 g of $FeCl_3 \cdot 6H_2O$ was dissolved in 560 ml of DI water (total weight=860 g). The iron chloride solution was slowly added to the caustic solution until the pH decreased to 8.0. A total of 525 g of iron chloride hexahydrate solution was used. Based upon the material added to the vessel, the composition of the resulting product was 74% by weight iron metal and 26% silicon metal. The resulting gel was blended for 4 hours, then allowed to stand overnight. In the morning, the gel was mixed, then filtered. The product was washed 3 times in near boiling DI water, filtered, and then dried overnight at 80° C. The resulting material was prepared as 20×40 mesh granules (density=0.65 g/cm$^3$). The surface area of the resulting material was 401 m$^2$/g. The sample was evaluated using X-ray photoelectron spectroscopy. Analysis of the oxygen 1s photoelectron region yielded 70% terminal hydroxyl groups. The resulting sample was evaluated for its ability to remove $SO_2$ using the test method described above in Testing Methods. The $SO_2$ breakthrough time was 18 minutes.

Example 9: Preparation of 67% Fe-33% Al Oxy-Hydroxide

An iron-aluminate material was prepared by dissolving 80 g NaOH and 60 g $NaAlO_3$ in 1 liter DI water. The resulting solution was mixed on a high shear mixer. The water had to be heated to about 60-70° C. in order to dissolve the sodium aluminate. Once dissolved, a cooling coil was placed in the pail to reduce, then maintain the temperature at about 20° C. during the precipitation operation. A second solution was prepared by dissolving 200 g of iron chloride hexahydrate in DI water to a total volume of 600 ml (686 g solution). The 680 g of the resulting solution was added over a 30 minute time period to achieve a pH of 8.0. The resulting gel was mixed for 4 hours, then allowed to stand overnight. In the morning, the gel was re-mixed, then filtered. The product was washed 3 times with near-boiling DI water, then dried at 80° C. overnight. The resulting material was prepared as 20×40 mesh granules (density=0.93 g/cm$^3$). The surface area of the resulting material was 312 m$^2$/g. The sample was evaluated using X-ray photoelectron spectroscopy. Analysis of the oxygen 1s photoelectron region yielded 72% terminal hydroxyl groups. The resulting sample was evaluated for its ability to remove $SO_2$ using the test method described above in Testing Methods. The $SO_2$ breakthrough time was 26 minutes.

Example 10: Preparation of a 51% Fe-49% Al Oxy-Hydroxide

An iron-magnesium-silicate material was prepared by dissolving 80 g NaOH and 60 g $NaAlO_3$ in 1 liter DI water. The resulting solution was mixed on a high shear mixer. The water had to be heated to about 60-70° C. in order to dissolve the sodium aluminate. Once dissolved, a cooling coil was placed in the pail to reduce, then maintain the temperature at about 20° C. during the precipitation operation. A second solution was prepared by dissolving 200 g of iron chloride hexahydrate in DI water to a total volume of 600 ml (686 g solution). The 680 g of the resulting solution was added over a 30 minute time period to achieve a pH of 8.0. The resulting gel was mixed for 4 hours, then allowed to stand overnight. In the morning, the gel was re-mixed, then filtered. The product was washed 3 times with near-boiling DI water, then dried at 80° C. overnight. The resulting material was prepared as 20×40 mesh granules (density=0.71 g/cm$^3$). The surface area of the resulting material was 333 m$^2$/g. The sample was evaluated using X-ray photoelectron spectroscopy. Analysis of the oxygen 1s photoelectron region yielded 64% terminal hydroxyl groups. The resulting sample was evaluated for its ability to remove $SO_2$ using the test method described above in Testing Methods. The $SO_2$ breakthrough time was 19 minutes.

Example 11: Preparation of 70% Fe-30% Zr Oxy-Hydroxide

An iron-zirconia oxy-hydroxide material was prepared by adding 202.7 g of a zirconium oxychloride solution (14.9 wt % Zr) to a 1 liter beaker and bringing the volume to 700 ml using DI water. To the solution was then added 339 g of iron (III) chloride hexahydrate (20.7 wt % Fe). 1.5 liters of Di water was added to a 4 liter plastic pail along with a trace of a 50% NaOH solution in order to increase the pH of the water to 13. A cooling coil was placed in the pail to maintain the temperature at about 20° C. during the precipitation operation. The iron-zinc solution was added to the water using a peristaltic pump. The pH of the resulting slurry was maintained at 13 using a 50% NaOH solution. The slurry was mixed using a high shear mixer. The resulting gel was mixed for 4 hours, then allowed to stand overnight. In the morning, the gel was re-mixed, then filtered. The product was washed 3 times with hot DI water, then dried at 90° C. overnight. The resulting material was prepared as 20×40 mesh granules (density=1.21 g/cm$^3$). The surface area of the resulting material was 163 m$^2$/g. The sample was evaluated using X-ray photoelectron spectroscopy. Analysis of the oxygen is photoelectron region yielded 48% terminal hydroxyl groups. The resulting sample was evaluated for its ability to remove SO$_2$ using the test method described above in Testing Methods. The SO$_2$ breakthrough time was 19 minutes.

Example 12: Preparation of a 57% Fe-27% Si-16% Mg Oxy-Hydroxide

A magnesium-iron-silicon hydroxide was prepared by adding 80 grams of sodium hydroxide and 100 grams of sodium silicate solution (28% SiO$_2$) to 1 L of DI water. Once blended, 30 grams of tetrapropylammonium bromide was added. A second solution was prepared by dissolving 200 grams of iron chloride and 100 grams of magnesium chloride in 550 grams of DI water. The iron-magnesium solution was added to the sodium aluminate solution to a pH of 8. This required 614 g of solution. The precipitated material was blended for 3.5 hours, then allowed to stand overnight. In the morning, the material was remixed for 5 minutes, and then filtered. The material was then washed three times in DI water, with the resulting solids dried overnight at 80° C. The resulting material was 16% Mg/27'%  Si/57% Fe by weight. The surface area of the sample was 446 m$^2$/g. The resulting material was prepared as 20×40 mesh granules (density=0.71 g/cm$^3$). The sample was evaluated using X-ray photoelectron spectroscopy. Analysis of the oxygen is photoelectron region yielded 82% terminal hydroxyl groups. The resulting sample was evaluated for its ability to remove SO$_2$ using the test method described above in Testing Methods. The SO$_2$ breakthrough time was 20 minutes.

Example 13: Preparation of a 35% Fe-65% Cu Oxy-Hydroxide

An iron-copper oxy-hydroxide material was prepared by adding 393 g of a copper sulfate pentahydrate (25.5 wt % Cu) and 264 g of iron (III) chloride hexahydrate (20.7 wt % Fe) to a 1 liter beaker. The salts were dissolved by bringing the volume to 1,000 ml with DI water. To the solution was then added 339 g of iron (III) chloride hexahydrate (20.7 wt % Fe). 1.2 liters of DI water was added to a 4 liter plastic pail along with a trace of a 50% KOH solution in order to increase the pH of the water to 13.5. A cooling coil was placed in the pail to maintain the temperature at about 20° C. during the precipitation operation. The iron-copper solution was added to the water using a peristaltic pump. The pH of the resulting slurry was maintained at 13.5 using a 50% KOH solution. When approximately 150 ml of iron-copper solution remained, the pH of the slurry was allowed to decrease to 12.5, where the pH was maintained using the KOH solution throughout the precipitation operation. The slurry was mixed using a high shear mixer. The resulting gel was mixed for 4 hours, then allowed to stand overnight. In the morning, the gel was re-mixed, then filtered. The product was washed 3 times with hot DI water, then dried at 90° C. overnight. The resulting material was prepared as 20×40 mesh granules (density=1.07 g/cm$^3$). The surface area of the resulting material was 164 m$^2$/g. The sample was evaluated using X-ray photoelectron spectroscopy. Analysis of the oxygen is photoelectron region yielded 72% terminal hydroxyl groups. The resulting sample was evaluated for its ability to remove SO$_2$ using the test method described above in Testing Methods. The SO$_2$ breakthrough time was 29 minutes.

Example 14: Preparation of 31% Fe-56% Cu-13% Si Oxy-Hydroxide

An iron-copper-silicon oxy-hydroxide material was prepared as follows. 76.5 g of sodium silicate solution (13.07 wt % Si) was added to 400 ml DI water containing 30 ml of HCl solution. The final volume of the solution was brought to 600 ml using DI water. To the solution was added 393 g of a copper sulfate pentahydrate (25.5 wt % Cu) and 264 g of iron (III) chloride hexahydrate (20.7 wt % Fe). The salts were dissolved by bringing the total volume to 1,600 ml with DI water and mixing. 1.2 liters of DI water was added to a 4 liter plastic pail along with a trace of a 50% KOH solution in order to increase the pH of the water to 13.5. A cooling coil was placed in the pail to maintain the temperature at about 20° C. during the precipitation operation. The iron-copper-silicon solution was added to the water using a peristaltic pump. The pH of the resulting slurry was maintained at 13.5 using a 50% KOH solution. When approximately 300 ml of the iron-copper-silicon solution remained, the pH of the slurry was allowed to decrease to 12.5, where the pH was maintained using the KOH solution throughout the precipitation operation. The slurry was mixed using a high shear mixer. The slurry was mixed for 6 hours, then allowed to stand overnight. In the morning, the slurry was re-mixed, then filtered. The product was washed with hot DI water, washed twice with room temperature DI water, and then dried at 90° C. overnight. The resulting material was prepared as 20×40 mesh granules (density=1.10 g/cm$^3$). The surface area of the resulting material was 273 m$^2$/g. The sample was evaluated using X-ray photoelectron spectroscopy. Analysis of the oxygen is photoelectron region yielded 57% terminal hydroxyl groups. The resulting sample was evaluated for its ability to remove SO$_2$ using the test method described above in Testing Methods. The SO$_2$ breakthrough time was 21 minutes.

Example 15: Preparation of a 60% Zn-30% Fe-10% Zr Oxy-Hydroxide

A zinc-iron-zirconium oxy-hydroxide material was prepared as follows. 67.5 g of zirconium oxychloride solution (14.81 wt % Zr) was brought to 500 ml DI water. To the solution was added 144.9 g of an iron(III) chloride hexahydrate (20.7 wt % Cu) and 200 g of a zinc chloride solution (30.0 wt % Zn). The volume of the solution was brought to 800 ml using DI water. 1.2 liters of DI water was added to a 4 liter plastic pail along with a trace of a 50% KOH solution in order to increase the pH of the water to 13.5. A cooling coil was placed in the pail to maintain the temperature at about 20° C. during the precipitation operation. The metal solution was added to the water using a peristaltic pump. The pH of the resulting slurry was maintained at 13.5 using a 50% KOH solution. The slurry was mixed using a high shear mixer. The resulting gel was mixed for 5 hours, then allowed to stand overnight. In the morning, the slurry was re-mixed, then filtered. The product was washed twice with hot DI water, washed a final time with room temperature DI water, and then dried at 90° C. overnight. The resulting material was prepared as 20×40 mesh granules (density=1.31 g/cm³). The surface area of the resulting material was 169 m²/g. The resulting sample was evaluated for its ability to remove $SO_2$ using the test method described above in Testing Methods. The $SO_2$ breakthrough time was 26.5 minutes.

Example 16: Preparation of a 90% Zn-10% Co Oxy-Hydroxide

A zinc-cobalt oxy-hydroxide material was prepared as follows. 75 g of zinc oxide (80.3 wt % Zn) was dissolved in 400 ml DI water using sulfuric acid. To the solution was added 27.1 g of cobalt chloride hexahydrate (24.7 wt % Co). The volume of the solution was brought to 600 ml using DI water. 1.2 liters of DI water was added to a 4 liter plastic pail along with a trace of a 50% KOH solution in order to increase the pH of the water to 13.5. A cooling coil was placed in the pail to maintain the temperature at about 20° C. during the precipitation operation. The metal solution was added to the water using a peristaltic pump. The pH of the resulting slurry was maintained at 13.5 using a 50% KOH solution. The slurry was mixed using a high shear mixer. The resulting gel was mixed for 6 hours, then allowed to stand overnight. In the morning, the slurry was re-mixed, then filtered. The product was washed twice with hot DI water, washed a final time with room temperature DI water, and then dried at 90° C. overnight. The resulting material was prepared as 20×40 mesh granules (density=1.08 g/cm³). The surface area of the resulting material was 137 m²/g. The resulting sample was evaluated for its ability to remove $SO_2$ using the test method described above in Testing Methods. The $SO_2$ breakthrough time was 20.5 minutes.

The invention claimed is:

1. A porous metal oxy-hydroxide reactive media comprising a mixed metal oxy-hydroxide of the formula:

$$X_1\text{-}M_1\text{-}O\text{-}M_2\text{-}X_2$$

wherein $M_1$ and $M_2$ are each independently copper, iron, zinc, magnesium, calcium, cobalt, titanium, zirconium, aluminum, or silicon, $M_1$ is a different metal than $M_2$, $X_1$ and $X_2$ are each independently $(OH)_n$, $-(O\text{-}M_1)_y\text{-}(OH)_n$ or $-(O\text{-}M_2)_y\text{-}(OH)_n$; n is 1, 2, or 3; and y is a value from 0 to 100 or more;

wherein the reactive media has a surface area of about 50 m²/g or greater.

2. The porous metal oxy-hydroxide reactive media of claim 1, having a surface area of 200 m²/g or greater.

3. The porous metal oxy-hydroxide reactive media of claim 1, wherein the fraction of oxygen associated with the formula as terminal hydroxyl groups is about 20 atomic percent or greater of the total oxygen.

4. The porous metal oxy-hydroxide reactive media of claim 1, wherein the fraction of oxygen associated with the formula as terminal hydroxyl groups is about 70 atomic percent or greater of the total oxygen.

5. The porous metal oxy-hydroxide reactive media of claim 1, wherein the media has a water solubility of about 1 gram per liter or less.

6. The porous metal oxy-hydroxide reactive media of claim 1, wherein the media has a water solubility of about 0.1 gram per liter or less.

7. The porous metal oxy-hydroxide reactive media of claim 1, wherein $M_1$ comprises copper, iron, or zinc and is present at about 50 to about 90 atomic percentage of metal in the media.

8. The porous metal oxy-hydroxide reactive media of claim 7, wherein:

$M_2$ is selected from the group consisting of magnesium, calcium, cobalt, titanium, zirconium, aluminum, and silicon; and $M_2$ is present at about 10 to about 50% atomic percentage of metal in the media.

9. The porous metal oxy-hydroxide reactive media of claim 8, wherein $M_2$ is silicon.

10. The porous metal oxy-hydroxide reactive media of claim 9, wherein $M_1$ is copper, iron, or zinc and is present at about 50 to about 90 atomic percentage of metal in the media.

* * * * *